UNITED STATES PATENT OFFICE.

JULIA A. KNOX, OF BURR OAK, KANSAS.

REMEDY FOR HOG AND CHICKEN CHOLERA.

SPECIFICATION forming part of Letters Patent No. 345,788, dated July 20, 1886.

Application filed April 22, 1886. Serial No. 199,783. (No specimens.)

*To all whom it may concern:*

Be it known that I, JULIA A. KNOX, a citizen of the United States, residing at Burr Oak, in the county of Jewell and State of Kansas, have invented certain new and useful Improvements in Compounds for Cholera; and I do hereby declare the following to be a full, clear, and exact description of the invention, such as will enable others skilled in the art to which it appertains to make and use the same.

My invention relates to a compound for the cure of cholera in animals and poultry; and it consists of the several ingredients hereinafter mentioned, and pointed out in the claim.

The object of my invention is to provide a compound for the treatment of cholera in animals and poultry, especially hogs, turkeys, and chickens, which is composed of ingredients which are harmless, but quick and efficient in their action.

My compound consists of the following ingredients, combined in the proportions stated, viz: tincture of muriate of iron, four ounces; tincture of capsicum, one ounce; tincture of ginger, one ounce; tincture of cinnamon, one ounce; tincture of camphor, one ounce. These ingredients are to be thoroughly mingled by agitation.

In using the above-named compound for hogs, the doses administered must vary in proportion to the size or weight of the animals. For hogs weighing one hundred and fifty pounds the dose is one table-spoonful, and for hogs weighing three hundred pounds two table-spoonfuls, while for hogs weighing seventy-five pounds two-thirds of a table-spoonful, with an increase or decrease proportionate to the varying weights of the animals. The number of does given an animal is controlled by the severity of the disease.

I preferably give the medicine by mixing it with the animal's food; but in extreme cases it may be forcibly administered.

For the treatment of poultry the compound or medicine is mixed with sweet milk, water, or ground feed. To one gallon of sweet milk or water I add one and one-half table-spoonfuls of the compound, thoroughly mixing the same with the milk or water. The milk or water containing the medicine is placed in a convenient place, so that the poultry in drinking will take the said water or milk containing the medicine.

In mixing the compound with ground feed, I take one gallon of meal and add one and one-half table-spoonful of the said compound, mixing the two until the medicine shall have thoroughly permeated the meal. The meal containing the mixture is then fed to the poultry in any well-known manner. It may also be forcibly administered to poultry in extreme cases the same as to animals.

This compound is especially adapted for the treatment of cholera in hogs, and by experiment I find the proportions above stated to be the most effectual; but it is obvious that the stated proportions of the ingredients could be slightly varied, if desired, to suit the nature of the animals to which it is to be administered.

Having thus described my invention, what I claim as new, and desire to secure by Letters Patent, is—

The herein-described compound, consisting of the tinctures of muriate of iron, capsicum, ginger, cinnamon, and camphor, mixed in about the proportions specified, for the purposes set forth.

In testimony whereof I affix my signature in presence of two witnesses.

JULIA A. KNOX.

Witnesses:
C. FORNEY,
H. L. HORNER.